March 19, 1963 D. H. LIVINGSTON ETAL 3,081,897
FIELD CRATES
Filed April 14, 1960 3 Sheets-Sheet 1
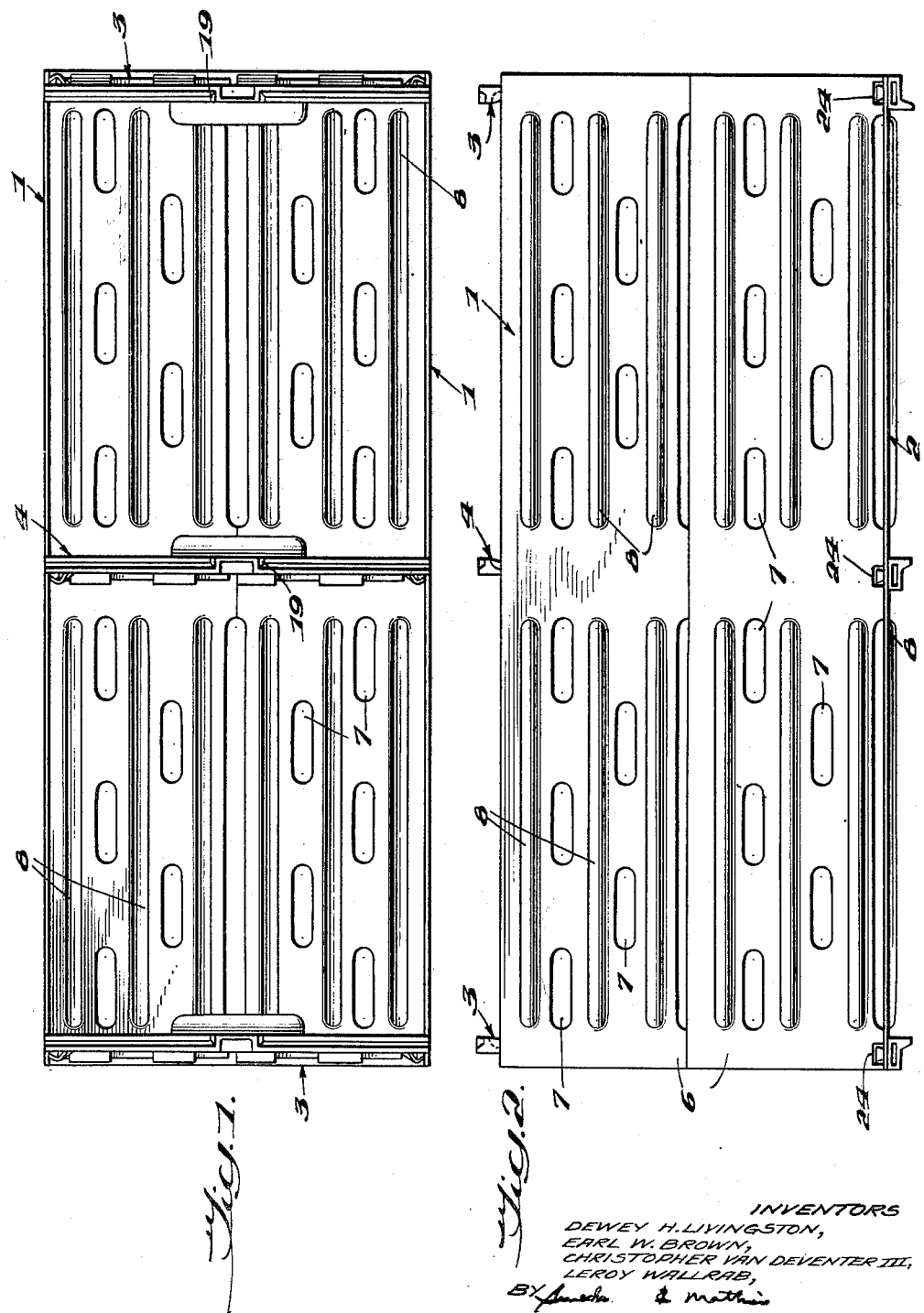
INVENTORS
DEWEY H. LIVINGSTON,
EARL W. BROWN,
CHRISTOPHER VAN DEVENTER III,
LEROY WALLRAB,
ATTORNEYS

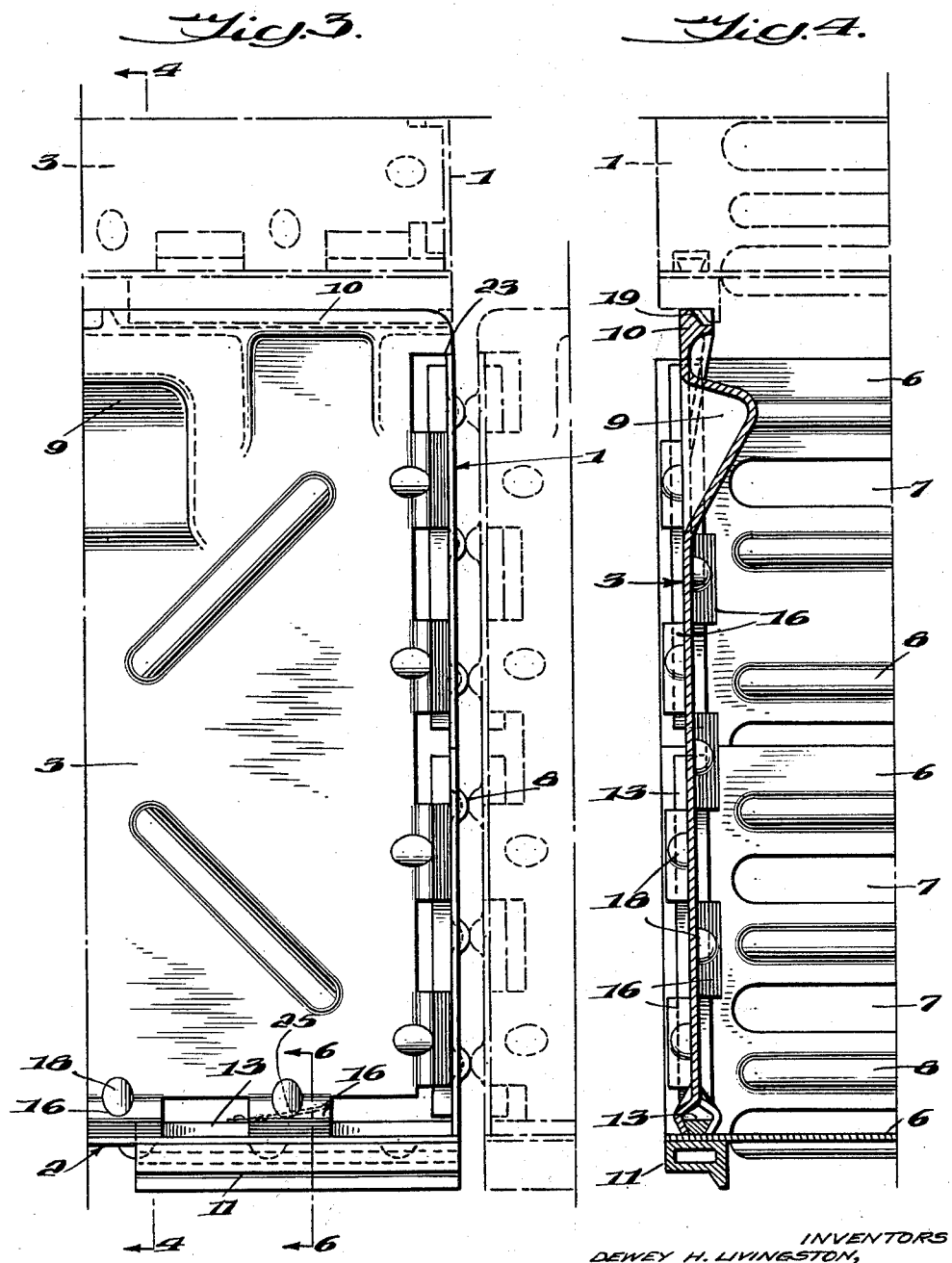

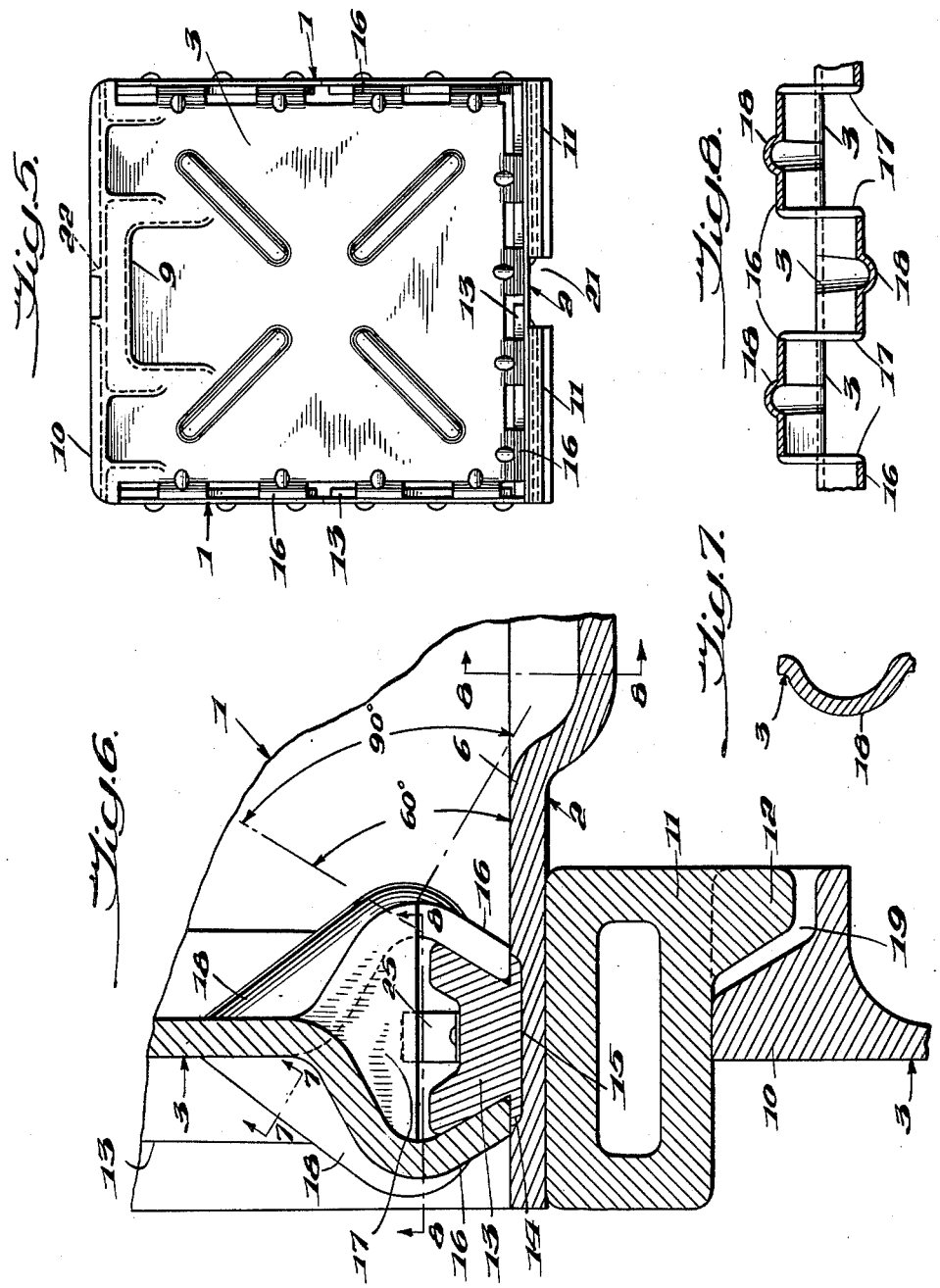

United States Patent Office 3,081,897
Patented Mar. 19, 1963

3,081,897
FIELD CRATES
Dewey H. Livingston, Eustis, Fla.; Earl W. Brown, Deland, Fla.; and Christopher Van Deventer III and LeRoy Wallrab, both of 2330 McCalla Ave., Knoxville, Tenn.
Filed Apr. 14, 1960, Ser. No. 22,260
5 Claims. (Cl. 220—4)

This invention relates to improvements in field crates of the character used for the collection of citrus fruit and other food products, for the purpose of transporting these to desirable points for use, re-packing or shipment.

Field crates have been constructed heretofore, usually of wooden slats or boards, suitably reinforced and held in place by nails, metal stripping, etc., and ordinarily are constructed with one or more receptacles to hold a measured quantity of fruit, vegetables, etc. The field crate should be constructed of a size that it may be readily handled, being lifted and transported by hand, and capable of being stored in stacked relation with other like containers, either on a transport vehicle or in a storage area.

Such field crates as in use heretofore, made of wood with metal reinforcing, have been subject to objections, both with respect to the construction of the crate itself and as to the deleterious effect on the fruit or vegetables contained therein. Some of these may be mentioned as examples.

Citrus fruit is subject to a blue mold which adheres to the fruit and causes spoilage in storage and transportation. The wooden crate in use heretofore has a tendency to harbor the fungus of the blue mold and thereby increases the effect and spread of this disease.

A wooden crate of the size used heretofore is subject to the absorption of moisture when standing in the field or orchard. Even though it may be built of relatively light weight woods and be comparatively light when dry, the tendency of the crate to absorb moisture causes it to increase in weight to an objectionable extent, especially when it is standing in a condition where it is subject to the absorption of moisture.

Wooden crates usually are built of rigid structure. No satisfactory knocked-down wooden crate has been proposed heretofore. Consequently, the storage and transportation of the empty crates requires a large capacity area substantially equal to the filled crates in these requirements.

One object of this invention is to overcome these objections and to improve the construction of containers of the character described.

Another object of the invention is to provide for the construction of containers of this character from molded plastic materials at a relatively low cost, while improving the character of the container both with respect to the construction thereof and as to the effect on the food products contained therein.

Still another object of the invention is to improve the construction of field crates of the character described, to permit these to be made of plastic or similar materials, be capable of being knocked down, disassembled for repair, etc., but free of damage to the fruit or other food products contained therein, and be of relatively light weight.

These objects may be accomplished, according to one embodiment of the invention, by constructing the container with side walls and ends and with an intermediate partition therebetween, if desired. Dovetailed connections are provided between the sides and ends, to permit sections to be interconnected by a sliding motion and yet be securely held in place when interconnected, so as to form a sturdy and rigid structure.

It is preferred that the parts be formed of plastic or other non-metallic and non-wooden materials, so as to be molded to required sizes and shapes. This assures of uniform construction and proper interfitting relation of the parts and it facilitates the assembly and disassembly thereof, especially when disconnecting the parts of the crate to a knocked-down condition for transportation.

A dovetail connection is provided between the parts, without interfering with the formation thereof by molding. The molding of these parts is made possible by staggering the side portions of the embracing sections of each dovetail joint, so as to permit the proper formation thereof in a compression or other mold, without reducing appreciably the strength and rigidity of these parts.

This embodiment of the invention is illustrated in the accompanying drawings, in which:

FIG. 1 is a top plan view of a complete crate made according to this invention;

FIG. 2 is a side elevation thereof;

FIG. 3 is a partial end elevation thereof and showing in dotted lines the relation of other stacked crates thereto;

FIG. 4 is a cross section through the end of the crate in FIG. 3, substantially on the line 4—4 in FIG. 3;

FIG. 5 is a full end elevation of the crate;

FIG. 6 is a cross section therethrough on an enlarged scale and taken on the line 6—6 in FIG. 3;

FIG. 7 is a detail cross section on the line 7—7 in FIG. 6; and

FIG. 8 is a detail cross section through one of the dovetail members on the line 8—8 in FIG. 6.

In the embodiment of the invention illustrated in the drawings, the crate or container is constructed so as to be used for gathering citrus fruit, as a field crate therefore, and to hold a measured quantity of such fruit. As such, the crate is shown as having two compartments in the respective opposite end portions thereof. The size and shape of the crate may be varied, however, according to the use to which it is to be put and, accordingly, may be constructed with one or more than one compartment, as found desirable.

In this embodiment, the crate is made with opposite side walls, generally indicated at 1, and with a bottom 2. Opposite ends are shown at 3 and, in the case where more than one compartment is provided, an intermediate partition may be used, as illustrated at 4.

Each of the side walls and bottom is formed preferably of a pair of slats 6 that extend throughout the length of the crate. These slats may be formed of any suitable or desired material, but it is preferred that they be made of a suitable plastic, such as phenolic resin, Bakelite, or other thermosetting compound which may be molded as, for example, by the compression method, to produce a high-impact plastic material. It is preferred that fibers be incorporated in the plastic material such, for example, as sisal, ramie, Sansevieria, or other suitable type. These fibers are impregnated with the phenolic resin or other suitable plastic material and molded under desired degrees of heat and pressure. An example thereof is a temperature of approximately 350° F. at from 200 to 1500 lbs. per square inch for three minutes. This will produce a product fulfilling the requirements. The fibers may be in a mat, or loose, and either random or unidirectional, according to the effect desired. This type of material may be used not only for the sides and ends and any partition employed, but also for the attachments, if desired, although some of the parts may be made of some other materials.

The slats 6 forming the sides and bottom 1 and 2, preferably are made with slots 7 spaced at intervals over the area therof for freedom of circulation of air throughout the crate. Outturned ribs 8 may be used, if desired, throughout portions of the areas of the slats 6 as, for example, being spaced apart transversely thereof and along the length thereof in the manner illustrated in FIGS. 1 and 2. These slots and ribs may be molded in the slats 6 during the formation of the latter.

Each end wall 3 and partition 4, if used, may be formed of the same material as described above for the slats 6, and likewise molded for use therewith. The structure of each end wall is shown in FIGS. 3 and 4 and extends substantially throughout the end area of the crate between the side walls 1 and above the bottom 2. Hand holds may be molded in each end wall 3, as illustrated at 9, near the upper edge thereof, to facilitate grasping of the crate at that point. A thickened supporting edge 10 is formed along the upper edge of the end wall 3 for stiffening or reinforcing the end wall and also for interfitting relation with skid portions or runners provided on adjacent crates stacked thereover to support the latter in tiered relation.

The slats 6 of the side walls 1 and bottom 2 are adapted to be connected with the end walls 3 through dovetail joints. These dovetail joints preferably extend along the lower edge of each end wall 3 and partition 4, if used, and along the opposite side edges thereof for secure interfitting relation of these parts.

Each of the slats 6 forming the bottom 2 is provided with skid members 11 extending transversely of the bottom 2 beneath the latter at each opposite end and preferably also at each partition 4 in vertical alignment therewith. The skid member 11 may be formed of the same material described above for each of the slats 6 or may be made of aluminum, steel, or other suitable material, either tubular, as shown in FIG. 6, or solid, as desired. A rib 12 is provided along one edge of the skid member 11 in such position as to overlap the supporting edge 10 of an adjacent crate end wall 3 disposed in stacking relation thereto, as illustrated in FIGS. 4 and 6. The provision of a rib 12 on one edge only of each skid member 11 not only assures of maintaining the stacked relation of the crates, whether filled or empty, but also prevents the picking up of a quantity of dirt and other foreign substances which would be retained in a channel member. The skid members 11 extend partway only transversely of the bottom 2, being in sections, with the sections aligned but spaced apart, as indicated at 21.

Secured upon the bottom slat members 6 and upon the side slat members are dovetail tongue sections 13. These tongue sections 13 may also be formed of plastic material, as described above, for the slats 6, or they may be formed of metallic materials, such as aluminum, steel, or the like. The shape of the dovetail tongue sections 13 may also vary according to the shape of the coacting dovetail sections, for proper sliding fit therewith.

The dovetail sections 13 extend either entirely across each side and bottom of the case, or partway only thereof, with sections aligned transversely of the case for interfitting connection with the adjacent ends 3 and partition 4, if the latter be used.

The tongue sections 13 are adhesively secured upon the slats 6 of the sides and bottom, or otherwise fixed thereto by rivets or other fastenings. In the example illustrated in FIG. 6, the tongue section 13 has a widened base portion 14 which is inserted into a groove 15 formed in the adjacent surface of the slat 6. The adhesive may be located within the groove 15 to increase the area of attachment of each of the tongue sections to the slat and thereby hold the tongue section securely in place for interfitting relation with the adjacent edge of the end wall 3 or partition 4. The base portion 14 may be molded integral with the tongue, or formed as a flat strip and adhesively or otherwise secured thereto.

The dovetail slot, to receive the tongue 13, is provided along each coacting edge of the end wall 3 and partition 4, by converging fingers 16 as shown in FIGS. 6 to 8. These fingers 16 preferably are molded in one integral piece with the corresponding end wall 3 and partition 4 and are spaced along said edge in staggered relation with each other. In order to mold the dovetail slot when the end pieces are lying horizontally in the mold, it was necessary to so design the mold that the parting line of the mold would be staggered. In other words, the dovetail slot itself in the molded piece would have one-half of the dovetail slot and the opposite side would be blank. Then, the next section of the molded part would be opposite, thus producing the staggered arrangement of the dovetail fingers.

The staggered dovetail fingers 16 are connected together by transversely extending webs 17, as shown in FIGS. 6 and 8, and which aid in stabilizing and reinforcing the structure. Each finger is also provided with a reinforcing rib 18 extending lengthwise thereof, as shown in FIGS. 6 and 7.

The crate has the two ends 3 and the middle section 4 all of the same size and provided with dovetail fingers along opposite edges thereof and along the bottom. The two slats 6 that form each side wall, each having a section of tongue 13 thereon, can be inserted by telescoping these tongue sections into the dovetail fingers 16 at the corresponding points, and the two slats that form the bottom 2 are secured in like manner to the ends and middle section. Thus, the parts can be assembled readily and quickly and by reversing the procedure, the parts can be disconnected, forming a knock-down case and enabling the case to be assembled in the field or for transportation in such knocked-down condition.

In assembling the parts of the crate, a jig may be used to position the two outside ends 3 and the middle section 4 in their proper respective positions. These ends and middle section will be placed in the jig in upside down relation with the top edge portion 10 at the bottom of the jig. The side wall slats 6 forming the respective sides 1 will then be inserted by a sliding motion down the dovetail segments of the ends and middle section and with the straight edge of the slats downward. This straight edge, which will be at the top of each side when the crate is completed and turned to its proper upright position, will be the fruit line when the crate is in use. The side wall slats abut against end portions 23 formed on the respective end walls and middle section at the opposite ends of the edge portion 10 thereof.

After thus assembling the slats that form the side walls 1 of the crate, the slats that form the bottom then can be inserted. One of the side wall slats is provided with notches 24 in the lower edge thereof (FIG. 2) which permits the bottom slats to be inserted transversely toward the opposite wall until this movement is stopped by the abutment of the tongue 13 against the lower edge of said opposite wall. The last base slat to be inserted should have means for confining it against sliding movement outwardly or being displaced.

In this embodiment of the invention, the means for this purpose is shown in the form of a spring clip 25 (FIGS. 3 and 6) secured in any suitable manner to the tongue 13 of the last base slat to be inserted. The securing means for the spring clip may be either adhesive or a suitable fastening, such as a rivet, which locates the spring tongue with one end of the spring clip secured in the groove of the tongue 13 and the opposite end projecting upwardly therefrom into the path of the webs 17. This spring tongue should be so located as to engage the second of these webs 17 from the adjacent side wall of the crate to insure of maintaining the locked relation of the parts and also making it easier for a person to depress the locking spring clip when disassembling the crate. A manual depressing of the spring clip is not necessary when the parts are assembled because the inward sliding movement of the last slat will depress the spring clip automatically.

A spring clip is provided on each opposite end of the last bottom slat to be inserted, to insure of holding the slats securely. In that way, the operator can use the thumbs of his two hands to depress the clips simultaneously for removing the slat while sliding the slat out of place in the crate in disassembling.

During assembly, after the slats are thus inserted as described, the crate is removed from the assembly jig and is inverted readily for use.

The skid sections 11 that extend transversely of the bottom afford nesting of the stacked cases to prevent them from sliding endwise with respect to each other, and by an interfitting arrangement with the upper edge 10 of the case therebelow, these runners also prevent sliding transversely of one case on another. The gap 21 between the skid sections or runners 11 is adapted to receive therein a convex middle section 22 above the handle 9 and formed at the upper edge of the crate, with a crate that is in stacked relation therewith, one above the other. This will prevent the crates from having a longitudinal slippage relative to each other.

Moreover, the runners 11 elevate the bottom of each case so as to form spacers or legs to permit the forks of a lift truck to be inserted beneath a case to pick it up for transportation or to lift a number of crates at one time. The interlocking is provided by angle tongue lands, indicated at 19 in FIGS. 1, 4 and 6. Tongue-and-groove or channel-shaped pieces provided at this point would be filled with dirt or leaves and thus prevent stacking, whereas the angular arrangement provided herein assures of proper stacking design and achieving the other results described.

The formation of the crate of a suitable plastic material, preferably combined with sisal or other fibers, produces a crate which is light in weight and is also dimensionally stable, strong, non-corrosive, non-toxic, chemical resistant, low moisture absorption, will withstand weathering, will not support a flame, and is of low comparative cost.

Not only is this material free of a tendency to harbor the fungus of blue mold which attacks citrus fruit, but numerous air vents are provided at 7 and 8 which will provide better ventilation, preserving the keeping quality of the food products contained therein. When the fruit is treated to bring out the color during the packing house operation, a material saving is effected in the time required for drying, as well as dyeing, by reason of the free circulation thus provided through the crate and between adjacent crates. It will be noted from FIG. 3 that the ribs 8 align with each other in crates stacked side-by-side, so as to permit freedom of hot air or gases to be circulated therebetween. By reason thereof, the hot gases are forced into the crates and around the fruit to reduce chlorophyl in the rind of the fruit and to bring out the natural color. The friut may be treated in the crate with liquid or gas, having freedom of circulation therethrough and around the fruit.

Since this is a knock-down crate, the crates will be stored and may be transported in knock-down condition, completely dismantled, requiring less storage space and less space during transportation. The crates can be assembled readily by the grower.

Repair of the crates may be effected simply and readily, merely by replacing worn or broken parts when needed. This is much faster and simpler than with wooden crates, where it is difficult to replace parts, thus effecting a material saving in both labor and material in maintaining the crates in repair and usuable condition.

The life expectancy of the crate is much longer than with wooden crates, from three to five times as long, and yet, due to the saving in cost of production and the saving in repair, its results in a substantially lower cost, but without reducing the volume of the contents.

While the invention has been illustrated and described in one embodiment, it is recognized that variations and changes may be made therein without departing from the invention as set forth in the claims.

We claim:

1. A knock-down crate of the character described, comprising sides and bottom and opposite ends, means forming detachable connections between the sides and bottom and the opposite ends, said means including fingers converging toward each other transversely of the edge of each end forming a dovetail groove therebetween, said fingers being spaced alternately at opposite sides along edges of the ends and forming slots, tongue sections connected with the sides and bottom and interfitting with said fingers, and reinforcing webs extending transversely of the slots between the ends of adjacent fingers.

2. A knock-down crate of the character described, comprising sides and bottom and opposite ends, means forming detachable connections between the sides and bottom and the opposite ends, said means including fingers converging toward each other transversely of the edge of each end forming a dovetail groove therebetween, said fingers being spaced alternately at opposite sides along edges of the ends and forming slots, and tongue sections connected with the sides and bottom and interfitting with said fingers, each of the fingers having a reinforcing rib disposed lengthwise along the outer side thereof.

3. In a crate of the character described having side and end walls, means forming a joint between adjacent portions of said walls, comprising a dovetail tongue on one of said wall portions having opposite sides converging toward said one wall portion, the adjacent wall portion having fingers along an edge thereof with the alternate fingers extending in converging directions from said adjacent wall portion, said fingers having the extremities thereof turned inward toward opposite sides of the tongue and slidably receiving the tongue between the fingers, each of the fingers having ribs formed in one integral piece therewith and extending transversely from opposite ends thereof across the space between the diverging portions of the fingers and joined to adjacent ends of adjacent fingers.

4. In a crate of the character described having side and end walls, means forming a joint between adjacent portions of said walls, comprising a dovetail tongue on one of said wall portions having opposite sides converging toward said one wall portion, the adjacent wall portion having fingers along an edge thereof with the alternate fingers extending in converging directions from said adjacent wall portion, said fingers having the extremities thereof turned inward toward opposite sides of the tongue and slidably receiving the tongue between the fingers, each of the fingers having ribs formed in one integral piece therewith and extending transversely from opposite ends thereof across the space between the diverging portions of the fingers and joined to adjacent ends of adjacent fingers, and a latch secured to the tongue in position for engagement selectively with the webs for locking the tongue against endwise displacement relative thereto.

5. In a crate of the character described having side and end walls, means forming a joint between adjacent portions of said walls, comprising a dovetail tongue on one of said wall portions having opposite sides converging toward said one wall portion, the adjacent wall portion having fingers along an edge thereof with the alternate fingers extending in converging directions from said adjacent wall portion, said fingers having the extremities thereof turned inward toward opposite sides of the tongue and slidably receiving the tongue between the fingers, said adjacent wall portion having a rib extending laterally from a side thereof at a point opposite each of the fingers in bridging relation to the outer extremity of the diverging portion of said finger, said rib being concavo-convex in cross section and substantially of uniform thickness throughout the width thereof.

References Cited in the file of this patent

UNITED STATES PATENTS

| | | |
|---|---|---|
| 653,514 | Kasschan | July 10, 1900 |
| 1,226,747 | Bugbee | May 22, 1917 |
| 1,883,553 | Chain | Oct. 18, 1932 |
| 1,990,883 | Terry | Feb. 12, 1935 |
| 2,311,613 | Slayter | Feb. 16, 1943 |
| 2,457,842 | Smith et al. | Jan. 4, 1949 |
| 2,549,013 | Robes et al. | Apr. 17, 1951 |
| 2,558,126 | Davenport | June 26, 1951 |
| 2,566,500 | Rose et al. | Sept. 4, 1951 |
| 2,593,779 | McGrath et al. | Apr. 22, 1952 |
| 2,727,286 | Moore | Dec. 20, 1955 |
| 2,862,640 | Somavia | Dec. 2, 1958 |